Patented June 28, 1932

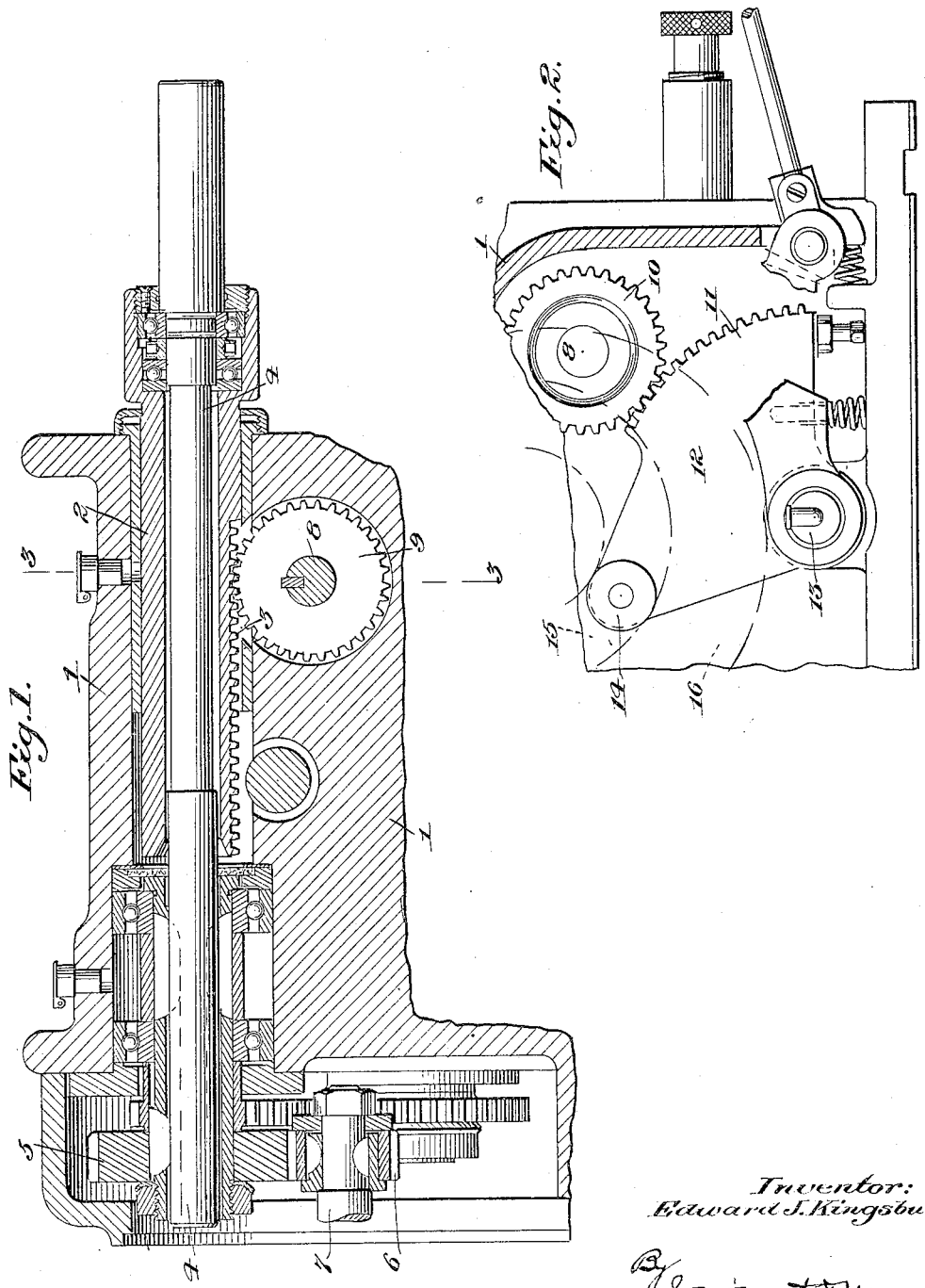

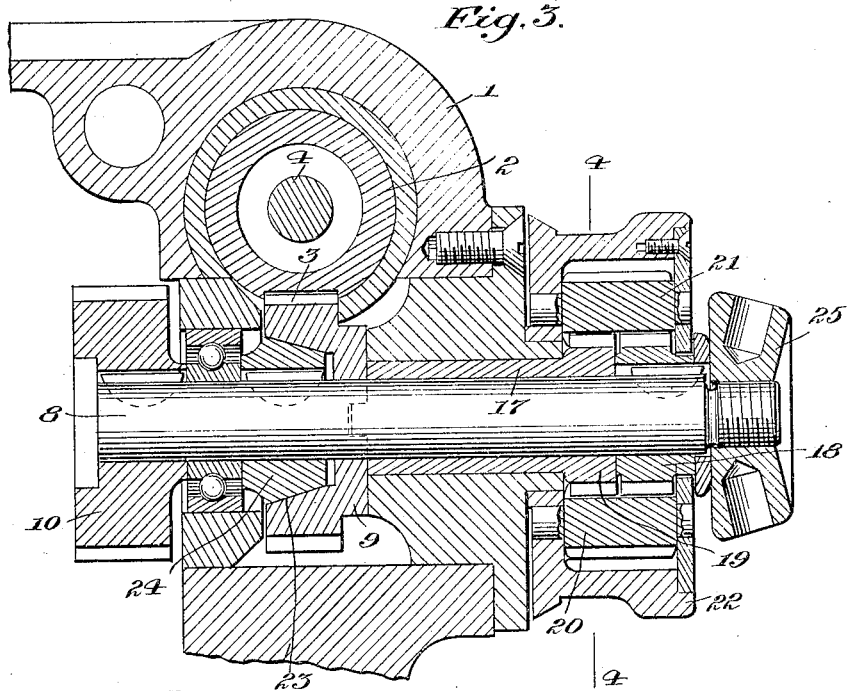
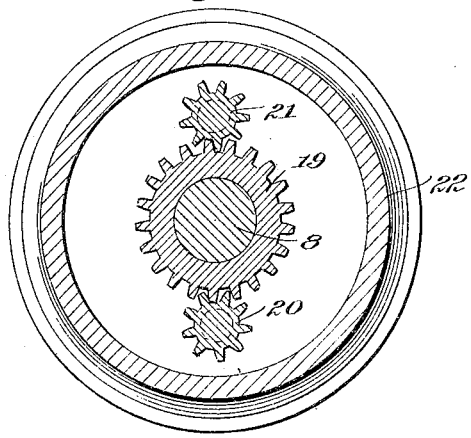

1,865,375

UNITED STATES PATENT OFFICE

EDWARD JOSLIN KINGSBURY, OF KEENE, NEW HAMPSHIRE

DRILLING MACHINE

Application filed January 23, 1928. Serial No. 248,862.

The invention relates to new and useful improvements in automatic drilling machines, and more particularly to the means for imparting a reciprocating movement to the drilling spindle for feeding the drill.

An object of the invention is to provide an automatic means for reciprocating the spindle for feeding the drill, which includes a member connected to an actuated means, and a member connected to the spindle for imparting endwise movements thereto, and devices for connecting the members so that movement of one is imparted to the other, and so that one member may be angularly shifted relative to the other for varying the working or reciprocating position of the spindle.

A further object of the invention is to provide a reciprocating means of the above type with means whereby said members may be fixedly connected together or disconnected from each other so as to permit the angular shifting of one member relative to the other.

A still further object of the invention is to provide a reciprocating means of the above type, wherein the actuated member and the member connected to the spindle are connected together by planetary gears, so that the movement of one member may be imparted to the other through said gears, or through the shifting of the planet gear, one member is shifted angularly relative to the other.

These and other objects will in part be obvious and will in part be hereinafter more fully disclosed.

In the drawings which show by way of illustration one embodiment of the invention—

Figure 1 is a sectional view through a portion of a drilling machine, showing the spindle adapted to carry the drill, in part, the means for rotating the spindle, and in part, the means for reciprocating the spindle;

Fig. 2 is a detail showing the oscillated segment for automatically rotating the gear which moves the spindle endwise for imparting feed movements to the drill;

Fig. 3 is a transverse sectional view on the line 3—3 of Fig. 1, and showing the planetary gear connection between the member which is connected to the spindle and the member connected to the actuated means which brings about the reciprocation of the spindle; also showing the independent means for connecting or disconnecting said members, and Fig. 4 is a section on the line 4—4 of Fig. 3.

The invention is directed broadly to an automatic drilling machine which includes a spindle which is driven preferably by a motor. The spindle is mounted in a housing so that it may be rotated and may also be moved endwise for imparting a feed movement to the drill. The spindle is moved endwise by automatic means which reciprocates the spindle in a predetermined definite path. The invention is directed more particularly to this automatic reciprocating means for imparting the feed movements to the drill spindle. The drill spindle is mounted in a sleeve which is capable of endwise movement in the housing therefor, and when the sleeve is moved endwise, it will impart an endwise movement to the drill spindle, and thus a feeding movement to the drill. The sleeve is provided with a rack which engages a pinion, and the pinion is rotated first in one direction and then the other for reciprocating the sleeve, and thus moving the drill forward into the material and retracting the same from the material. This pinion is mounted on a shaft which is rotated first in one direction and then the other by an oscillating segment gear. The oscillating segment gear is in turn oscillated by a rotating cam. This rotating cam is preferably operated from a motor which rotates the spindle by devices which control the feed movements so as to conform to the cutting capacity of the drill. When, however, the segment is given a complete oscillation, it will move the drill spindle in a fixed predetermined path. Only a portion of the machine embodying the features referred to above is shown in this application. The machine is more fully shown, described and claimed in my co-pending Patent No. 1,780,083 issued Oct. 28, 1930.

The improvement in the reciprocating means forming the subject-matter of the present application is directed to the manner of connecting the spindle to the actuating means therefor. The pinion meshing with the rack on the spindle is attached to a sleeve which is supported on a feed shaft mounted in suitable bearings in the housing. This feed shaft is provided with a gear which is keyed thereto, and which meshes with a segment, so that when the segment is oscillated, the feed shaft will be rotated first in one direction and then the other or oscillated. Geared to the other end of the feed shaft is a gear which is located alongside of a gear carried by the sleeve. These gears have the same pitch diameters, but one gear has a greater number of teeth than the other. Meshing with these two gears are planet gears arranged diametrically opposite each other about the axis of the shaft. These planet gears are mounted in a supporting member which is free to rotate about the shaft or rotate with the shaft. The planet gears mesh with both gears and serve as a means for connecting the sleeve to the shaft. These planet gears also serve as a means whereby the sleeve may be angularly adjusted relative to the shaft when the planet gears are turned about the axis of the shaft. An independent means is provided for connecting the shaft to the pinion so as to take the strain off the planetary gears when the machine is set for operation.

Referring more in detail to the drawings, the drilling machine includes a housing 1 in which is mounted a sleeve 2 carrying a rack 3. The sleeve 2 is mounted for reciprocation in the housing, but is held from rotating therewith. Located within the sleeve is a spindle 4 adapted to support a drill. The spindle 4 carries a gear 5 meshing with a gear 6 on a motor shaft 7. The operating means for rotating the spindle is shown more in detail in my companion patent referred to above.

Mounted in suitable bearings in the housing 1 is a feed shaft 8. This shaft 8 carries a pinion 9 which meshes with the rack 3. The pinion 9 is freely mounted on the shaft. Keyed to the shaft 8 is a pinion 10, and this pinion 10 meshes with a segment rack 11 carried by a segment lever 12 which is pivoted at 13. The segment lever carries a roller 14 engaging a groove 15 in a cam 16. As the cam 16 is rotated, it will cause the segment lever 12 to oscillate, and the segment lever 12, as it oscillates, will rotate the pinion 10, and this will impart a rotation to the feed shaft 8. All of these parts are clearly shown and described in detail in the co-pending patent.

The present invention has particularly to do with the means which connects the pinion 9 meshing with the rack on the spindle with the feed shaft 8. This connecting means is shown in detail in Fig. 3 of the drawings. The spindle 9, as noted above, is freely mounted on the shaft 8. It is, however, fixedly connected to a sleeve 17. This sleeve in turn is freely mounted in the shaft. The feed shaft 8 constitutes a member which is connected to an actuated means whereby the member is rotated. This actuated means includes the segment lever and the cam which oscillates the segment lever. The sleeve 17 constitutes a member which is connected to the spindle. Mounted on the feed shaft 8 and keyed thereto, is a gear 18. Formed as a part of the sleeve 17 is a gear 19. These gears are side by side and are of the same pitch diameter. The gear 18 is preferably cut with a gear shaper with twenty-one teeth, while the gear 19 is cut with twenty-three teeth. Meshing with these two gears 18 and 19 are two planet gears 20 and 21 diametrically opposed to each other. The planet gears are journaled in a housing 22 which is mounted in part on the main housing 1 and in part on the feed shaft. This housing 22 is free to rotate on the main housing; also on the sleeve and feed shaft. It is also free to rotate with the feed shaft on the main housing. The planet gears serve as a connecting means for connecting the feed shaft to the sleeve. It will be apparent, however, that if the planet gears are rotated about the axis of the feed shaft, they will angularly shift the sleeve relative to the feed shaft, and this will shift the position of the spindle either toward or from the material to be operated upon, depending upon the direction in which the planet gears are rotated. If the planet gears are rotated 180 degrees, then the angular shifting of the sleeve relative to the cross shaft will be the space of one tooth. This provides a means whereby the rotations of the feed shaft are imparted to the sleeve through this planetary gearing, and at the same time, by the shifting of the planet gear, the working or reciprocating position of the spindle will be changed.

When the character of the work changes, and it is found desirable that the drill shall have a feed movement imparted thereto, beginning at a different point relative to the housing of the drill, this is accomplished by the shifting of the planet gears. The drill is properly positioned to begin its operation, and will automatically be fed forward and retracted under the control of the automatic reciprocating means therefor.

As a further means for connecting the feed shaft 8 to the pinion 9 so as to relieve the strain on the planet gears when the machine is in operation, I have provided the pinion 9 with a cone-shaped friction surface 23. Keyed to the shaft 8 is a cone-shaped member 24. On the end of the feed shaft is a nut 25. This nut bears against a plate which in turn bears against the housing 22. gear 18 and sleeve 17, so that when the nut is turned in the proper direction, the friction cone surface on the member 24 is brought into gripping locked relation to the cone friction surface on the pinion 9, and thus it is that the pinion is fixedly connected to the feed shaft 8. These friction surfaces controlled by the nut 25 provide a means which is independent of the planetary gearing, whereby the actuated member, that is, the feed shaft, may be fixedly connected to the pinion which in turn is connected to and reciprocates the spindle. By turning the nut in the opposite direction, then these friction surfaces may be disconnected from each other, and this will allow a free adjustment of the planetary gears for bringing about a change in the working or reciprocating position of the spindle. Even if this friction means for fixedly connecting the feed shaft to the pinion be omitted from the machine, or left open, the planetary gearing will connect the feed shaft to the pinion, so that the rotations of the feed shaft will be imparted to the pinions, and at the same time, this planetary gearing connection will permit the angular position of the pinion relative to the feed shaft to be varied while still maintaining a driving connection between the two.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. The combination of a drill spindle adapted to carry a drill, means for rotating the spindle, means for automatically reciprocating the spindle for feeding the drill including a cam, a cam follower, a feed shaft oscillated thereby, a gear connected to said feed shaft, a gear connected to said spindle for reciprocating the same, one of said gears having a greater number of teeth than the other, planet gears meshing with the first-named gears for imparting angular movement of one gear to the other, and a housing surrounding the gears in which the planet gears are mounted, said housing being shiftable whereby the planet gears vary the angular position of the gears connected respectively to the feed shaft and the spindle for varying the reciprocating position of the spindle.

2. The combination of a drill spindle adapted to carry a drill, means for rotating the spindle, means for automatically reciprocating the spindle for feeding the drill including a cam, a cam follower, a feed shaft oscillated thereby, a gear connected to said feed shaft, a gear connected to said spindle for reciprocating the same, one of said gears having a greater number of teeth than the other, planet gears meshing with the first-named gears for imparting angular movement of one gear to the other, a housing surrounding the gears in which the planet gears are mounted, said housing being shiftable whereby the planet gears vary the angular position of the gears connected respectively to the feed shaft and the spindle for varying the reciprocating position of the spindle, and means independent of the planet gears for fixedly connecting the feed shaft to the spindle.

3. The combination of a drill spindle adapted to carry a drill, means for rotating the spindle, means for automatically reciprocating the spindle for feeding the drill including a cam, a cam follower, a feed shaft oscillated thereby, a pinion freely mounted on the feed shaft and connected to the spindle, a sleeve connected to the pinion, a gear carried by the sleeve, a gear splined to the feed shaft, said gears being side by side and having the same pitch diameter, one of said gears having a greater number of teeth than the other, and planet gears meshing with the gears carried by the sleeve and the feed shaft for causing said feed shaft and sleeve to turn as a unit for reciprocating the spindle, said planet gears being mounted in a housing shiftable about the feed shaft for changing the angular adjustment of the sleeve relative to the feed shaft for varying the reciprocating position of the spindle.

4. The combination of a drill spindle adapted to carry a drill, means for rotating the spindle, means for automatically reciprocating the spindle for feeding the drill including a cam, a cam follower, a feed shaft oscillated thereby, a pinion freely mounted on the feed shaft and connected to the spindle, a sleeve connected to the pinion, a gear carried by the sleeve, a gear splined to the feed shaft, said gears being side by side and having the same pitch diameter, one of said gears having a greater number of teeth than the other, planet gears meshing with the gears carried by the sleeve and the feed shaft for causing said feed shaft and sleeve to turn as a unit for reciprocating the spindle, said planet gears being mounted in a housing shiftable about the feed shaft for changing the angular adjustment of the sleeve relative to the feed shaft for varying the reciprocating position of the spindle, and means independent of the planet gears for fixedly connecting the feed shaft to the spindle.

In testimony whereof, I affix my signature.

EDWARD JOSLIN KINGSBURY.